US006600495B1

(12) United States Patent
Boland et al.

(10) Patent No.: US 6,600,495 B1
(45) Date of Patent: Jul. 29, 2003

(54) IMAGE INTERPOLATION AND DECIMATION USING A CONTINUOUSLY VARIABLE DELAY FILTER AND COMBINED WITH A POLYPHASE FILTER

(75) Inventors: Liza G. Boland, New York, NY (US); Johan G. Janssen, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 332 days.

(21) Appl. No.: 09/632,755

(22) Filed: Aug. 4, 2000

Related U.S. Application Data (60) Provisional application No. 60/175,190, filed on Jan. 10, 2000.

(51) Int. Cl.[7] .............................. G09G 5/02; G06K 9/40; H04N 9/74; G06F 17/10
(52) U.S. Cl. ....................... 345/660; 382/260; 348/581; 708/300
(58) Field of Search ................................. 708/313, 316, 708/319, 300; 382/260; 348/568, 581, 580; 345/660, 663, 667, 608

(56) References Cited

U.S. PATENT DOCUMENTS

| 4,382,297 A | | 5/1983 | Farrow ........................ 370/544 |
| 4,866,647 A | | 9/1989 | Farrow ........................ 708/313 |
| 5,023,825 A | * | 6/1991 | Luthra et al. ................ 708/313 |
| 5,182,633 A | * | 1/1993 | Antonio et al. ............. 348/441 |
| 5,574,572 A | * | 11/1996 | Malinowski et al. ....... 358/451 |
| 5,587,742 A | * | 12/1996 | Hau et al. .................... 348/441 |
| 5,812,608 A | | 9/1998 | Valimaki et al. ............ 375/331 |
| 5,864,545 A | * | 1/1999 | Gonikberg et al. ......... 370/286 |
| 5,892,695 A | | 4/1999 | Dalfsen et al. .............. 708/313 |
| 5,892,847 A | * | 4/1999 | Johnson ....................... 382/232 |
| 5,943,369 A | | 8/1999 | Knutson et al. ............. 375/326 |
| 6,101,517 A | * | 8/2000 | Meier .......................... 708/319 |
| 6,208,687 B1 | * | 3/2001 | Clemow ...................... 375/232 |
| 6,317,765 B1 | * | 11/2001 | Page et al. ................... 708/313 |
| 6,321,246 B1 | * | 11/2001 | Page et al. ................... 708/316 |
| 6,333,974 B1 | * | 12/2001 | Liang et al. ............. 379/93.35 |
| 6,360,240 B1 | * | 3/2002 | Takano et al. .............. 708/319 |
| 6,434,233 B1 | * | 8/2002 | Bjarnason et al. ...... 379/406.01 |

FOREIGN PATENT DOCUMENTS

| EP | 0327268 A2 | | 8/1989 | |
| GB | 2341993 A | * | 3/2000 | .......... H03D/07/16 |
| WO | 9819396 A2 | | 5/1998 | |

OTHER PUBLICATIONS

"A Continuously Variable Digital Delay Element", by C.W. Farrow, ISCAS 1998, pp. 2641–2645.
"FPGA Interpolators using Polynomial Filters", by C. Dick et al, ICSPAT 1990, pp. 684–689.

\* cited by examiner

*Primary Examiner*—Jeffery Brier
*Assistant Examiner*—Ryan Yang
(74) *Attorney, Agent, or Firm*—Laurie E. Gathman (57) ABSTRACT

A filter structure is provided that facilitates the use of the filter as either a continuous delay Farrow filter or a selectable delay polyphase filter. The less complex polyphase filter is used when the desired scale substantially corresponds to a defined phase of the polyphase filter, or when time or power is not available to achieve the desired scale exactly; otherwise, the continuous delay Farrow filter is used. By providing an ability to switch to a continuous delay, the number of stages of the polyphase filter can be reduced. Additionally, an inversion of a Farrow filter is presented that provides for a continuous delay decimation filter with substantially reduced computational complexity compared to a direct embodiment of a Farrow filter. This inverted filter is also configurable as a polyphase filter, to provide selectable scale-resolution capabilities.

20 Claims, 9 Drawing Sheets

IMAGE INTERPOLATION AND DECIMATION USING A CONTINUOUSLY VARIABLE DELAY FILTER AND COMBINED WITH A POLYPHASE FILTER

This application claims the benefit of U.S. Provisional Application No. 60/175,190, filed Jan. 10, 2000.

BACKGROUND OF THE INVENTION

1. Field of the Invention

This invention relates to the field of digital signal processing, and in particular to a digital filter for interpolating and decimating digitally encoded images.

2. Description of Related Art

In a digital display system, sample rate converters (SRCs) are used to effect a scaling of a digitally encoded image. A digitally encoded image, such as a video image, comprises an array of samples of the original image. A display screen area comprises an array of pixels, which may or may not correspond to the array of samples of the original image. If the number of samples in the horizontal and vertical direction are equal to the number of pixels in the horizontal and vertical direction, no scaling is necessary. Each sample is mapped to each corresponding pixel, and the resultant displayed image corresponds to the original image. If there are half the number of pixels as there are samples, every other sample is mapped to a corresponding pixel. The resultant image corresponds to an image that is sampled at half the sampling rate of the original samples. That is, a change of scale is equivalent to a change of sampling rate, hence the term 'sample rate converter'. Non-integer scaling is effected by generating pixel values corresponding to an estimate of the sample value that would have been obtained had the original sampling rate corresponded to this display scale. If the image is being down-sized, or down-converted, a decimator is used to "remove" sample values; if the image is being up-sized, or up-converted, an interpolator is used to "add" sample values. Conventional display systems include both a vertical sample rate converter and a horizontal sample rate converter to effect the scaling in either or both dimensions. If the display system is configured to only provide down-scaled images, such as a "picture-in-picture" feature, the sample rate converters comprise only a decimator. If the display system is configured to only present up-scaled images, such as a "zoom" feature, the sample rate converters comprise only an interpolator. To provide both up-scaling and down-scaling, the sample rate converters of conventional high-quality display systems include both a decimator and an interpolator.

Decimators and interpolators are typically embodied as digital filters, wherein the resultant pixel value is a weighted average of the samples in the vicinity of the pixel location. The number of samples used to determine the resultant weighted average is termed the number of "taps" of the digital filter. The general equation for an N-tap filter is given by:

$$y(i+p) = \sum_{n=0}^{N-1} c(n,p) * x(i-n). \tag{1}$$

where $x(i) \ldots x(i-(N-1))$ are the input samples at each tap of the N-tap filter, p is the phase, and $c(n,p)$ is the weight associated with each input sample at the specified phase. To provide a variety of scale factors, a "polyphase" filter is used. Each phase of a P-polyphase filter corresponds to an integer multiple of 1/P of the output scale for down-sampling, or 1/P of the input scale for up-sampling.

Figure 1:
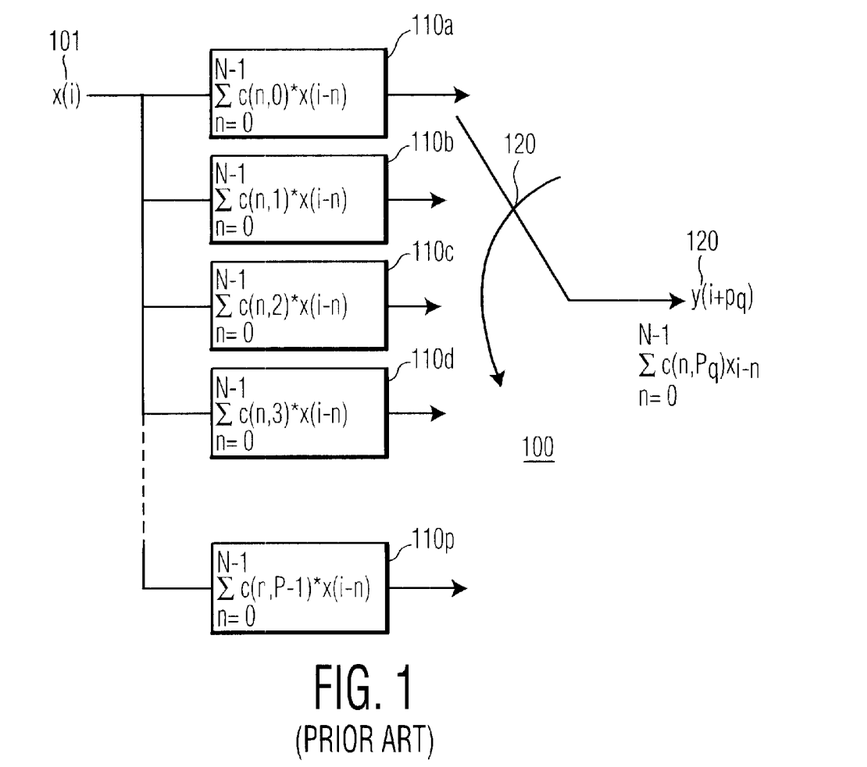
FIG. 1 illustrates an example conceptual diagram of an up-scaling polyphase filter, common in the art.

FIG. 1 illustrates a conceptual block diagram of an up-sampling polyphase filter with P phase stages 110a–110p. Input samples 101 are provided to each stage. If the output is an up-scaling by a factor of 1:P, the output of each stage 110a–p is selected by the switch 120, and P output values are provided in response to the receipt of each input sample 101. After producing the P output values, the next input sample 101 is received, and another P outputs are provided. In this manner, P output values are formed for each input sample, thereby providing an up-scaling by a factor of 1:P. If an up-scaling of Q:P is desired, Q of the P stages are selected for output for each input sample. For example, if Q is three, every third stage 101a, 101d, etc. is selected for output for each input sample.

Figure 2:
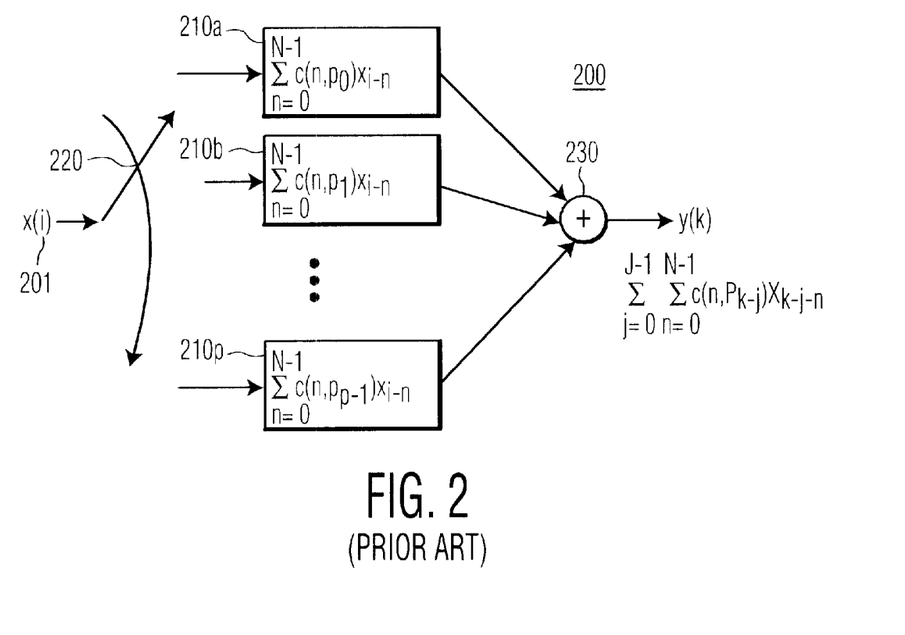
FIG. 2 illustrates an example conceptual diagram of an down-scaling polyphase filter, common in the art.

FIG. 2 illustrates a conceptual block diagram of a down-sampling polyphase filter with P phase stages 210a–210p. The input samples 201 are provided to select stages via the switch 220. If the output is a downscaling by a factor of P:1, the output of all P stages 210a–p are combined by the adder 230, and a single output value 231 is provided in response to the receipt of P input samples 201. After producing the output value, another set of P inputs 201 are used to produce the next output sample 231. In this manner, one output value is formed for P input samples, thereby providing a down-scaling by a factor of P:1. If a downscaling of Q:1 is desired, Q input samples 201 are provided select input stages 210a–p and the output of these stages are combined by the adder 230 to produce the single output sample 231.

Figure 3:
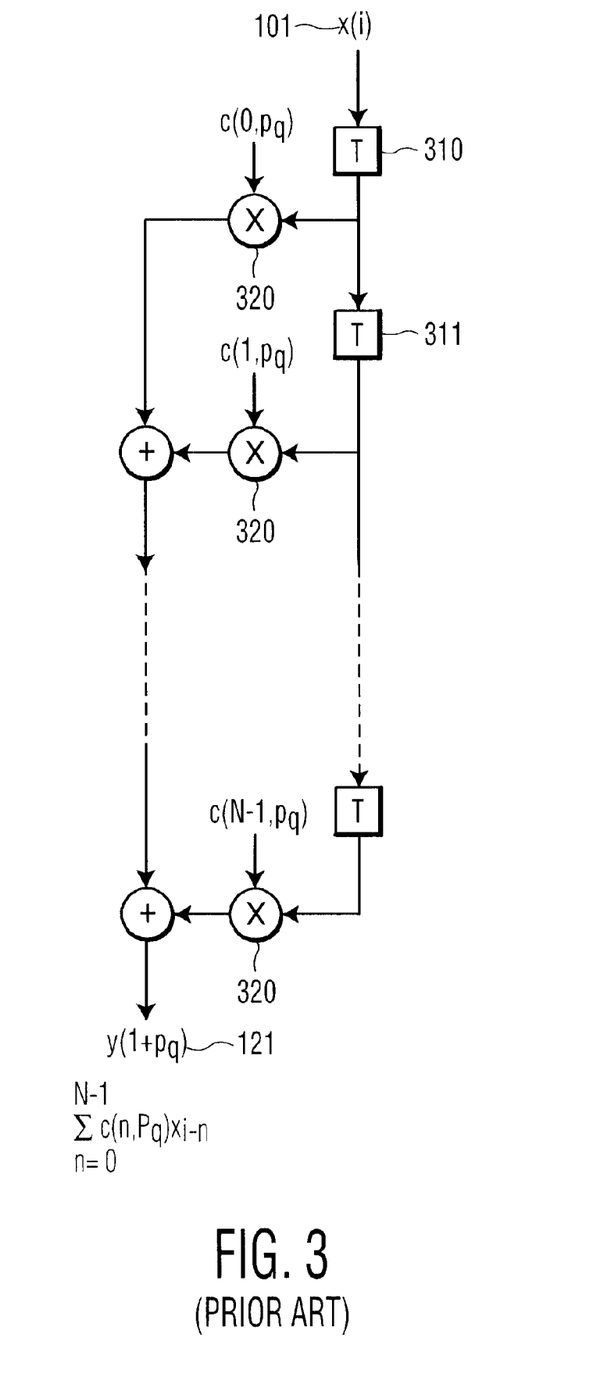
FIG. 3 illustrates an example block diagram of an up-scaling polyphase filter, common in the art.

A polyphase filter with N taps is typically embodied as a single filter with N registers and a memory that is configured to store the N coefficients for each of the P stages. The appropriate N coefficients are loaded into the N registers of the filter to produce each required output. U.S. Pat. No. 5,892,695, SAMPLE RATE CONVERTER, issued Apr. 6, 1999 for Age J. Van Dalfsen, Jeroen H. J. C. Stessen, and Johannes G. W. M. Janssen, discloses a polyphase filter configuration for effecting up-scaling and down-scaling, and is incorporated by reference herein. FIG. 3 illustrates an up-scaling polyphase filter as taught in the referenced patent, and FIG. 4 illustrates a down-scaling polyphase filter as also taught in the referenced patent.

In FIG. 3, each input sample x(i) 101 is sequentially clocked into the first polyphase delay elements 310. For each output sample y 121, the appropriate coefficient c(n,p(q)) is applied to the multipliers 320, where p(q) is the phase delay corresponding to the particular phase of the polyphase filter for each output sample y 121. After each of the upscaled samples y 121 are produced, the next input sample x(i) 101 is clocked into the first polyphase delay element 310, while the prior x(i) sample is clocked on to the next delay element 311, and the above process is repeated.

Figure 4:
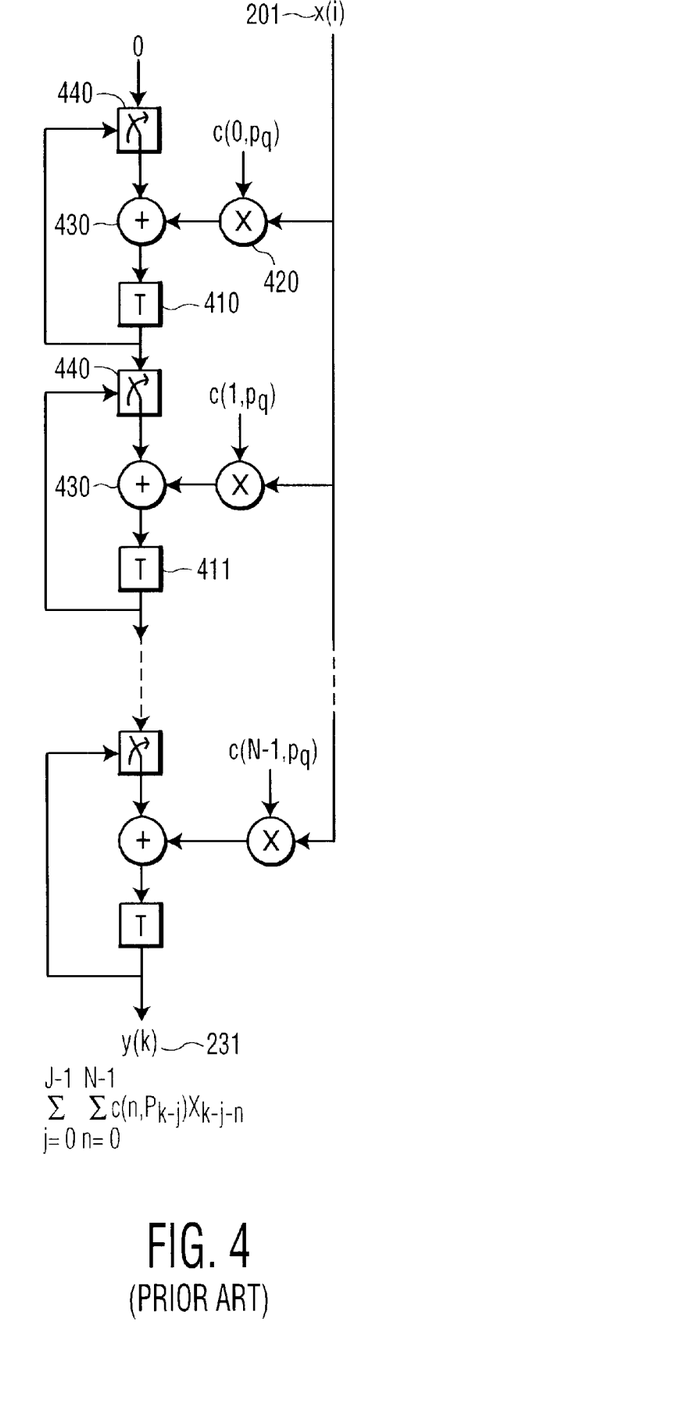
FIG. 4 illustrates an example block diagram of an down-scaling polyphase filter, common in the art.

In FIG. 4, each input sample x(i) 201 is multiplied by the appropriate coefficient c(n,p(q)), and an intermediate sum is accumulated in the corresponding delay element 410, 411, etc. by setting the switches 440 to effect a loop of the contents of the delay element through the adder 430. When the $Q^{th}$ input x(i) 201 arrives in a Q:1 downscaling, the switch 440 is set to effect a transfer of the contents of each delay elements on to the next delay element, also via the adder 430 that adds the appropriate c(n,p(q))*x(i) to the accumulated sum that is transferred to the next delay element. The referenced patent contains additional detail regarding the operation of the filters of FIGS. 3 and 4.

The coefficients c(n,p) for each of the P phases of a polyphase filter are typically stored in a local memory, for application to the multipliers 320, 420 as required. The storage requirement for a P-polyphase filter with N-taps is P*N, and is illustrated by an array 510 of coefficients c(n,p) in FIG. 5. Each of the P rows of FIG. 5 contains the N-coefficients for a given phase p, each of the N columns corresponding to each of the coefficients for a given tap.

Figure 5:
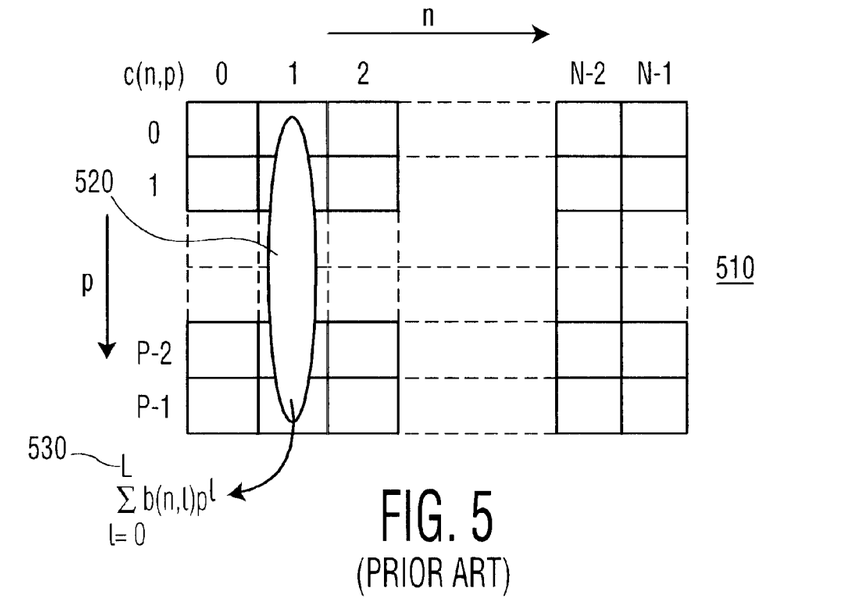
FIG. 5 illustrates an example array of coefficients corresponding to a polyphase filter, common in the art.

U.S. Pat. No. 4,866,647 "CONTINUOUSLY VARIABLE DIGITAL DELAY CIRCUIT", issued Sep. 12, 1989 to C. W. Farrow, incorporated by reference herein, describes a filter, hereinafter a "Farrow filter", wherein the individual coefficient of each tap is computed based on a polynomial equation. Each column of coefficients 520 is approximated by an L-order polynomial 530 having phase p as the independent variable, and the coefficient c(n,p) 520 at this phase as the dependent variable, using conventional curve fitting techniques. By using a polynomial approximation, the coefficients c(n,p) of any phase value p can be computed, and therefore the Farrow filter provides a continuous phase filter. A continuous phase filter is conventionally termed a continuous delay filter. As contrast to the polyphase filter, which has a resolution of 1/P (interpolations beyond 1:P are limited to, at most, P unique values, any additional values being either duplicates or combinations of these P unique values), the resolution of a continuous phase filter is virtually unlimited (each phase generates a unique set of coefficients, subject only to the precision of the coefficient generator). The accuracy of the Farrow filter, compared to a polyphase filter, depends primarily upon the order of the polynomial approximation. It has been found that a third-order polynomial provides acceptable accuracy, a fourth-order polynomial being common in high quality Farrow filters. The resolution of the Farrow-filter is dependent only upon the resolution of the curve-fitting coefficients b(n,l) and the resolution of the input parameter corresponding to the phase p being estimated, hereinafter termed the delay parameter d. Preferably, the curve fitting coefficients are determined such that a range of d from 0 to $2^{m-1}-1$ corresponds to a range of phase from 0 to $2\pi$, where m is the number of bits used to contain the delay term d.

Figure 6A:
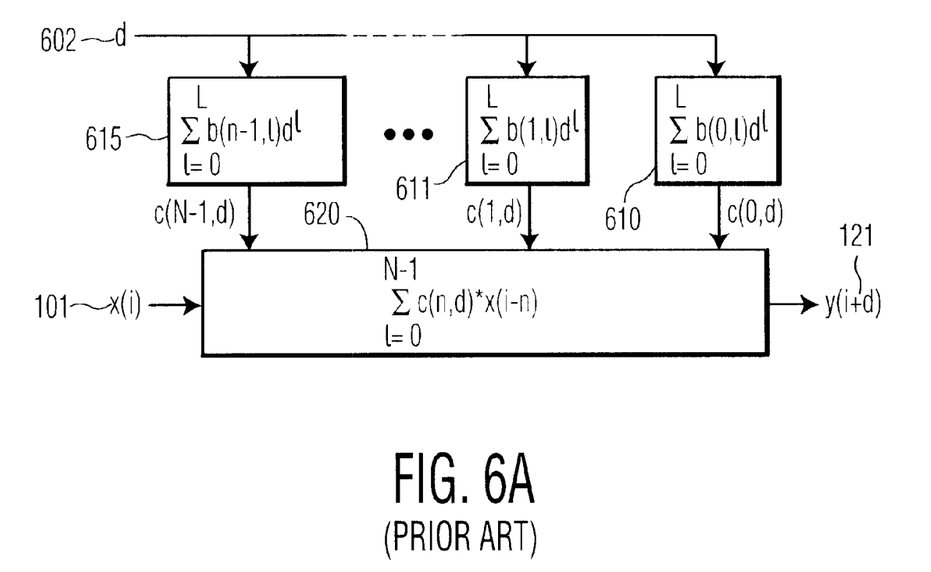
FIGS. 6A–6B illustrate an example block diagram of a prior art Farrow filter for up-scaling.

FIG. 6A illustrates a block diagram of a direct embodiment of an up-scaling Farrow filter. Each of the N blocks 610, 611, . . . 615 are configured to compute the coefficients c(0), c(1), . . . c(n) for use by the filter 620 to produce the output y 121 corresponding to an input x(i) 101 and phase d 602. The filter 620 corresponds to a conventional filter, such as used in the aforementioned polyphase filter 100, as described by equation 1, repeated here for ease of reference:

$$y(i+p) = \sum_{n=0}^{N-1} c(n,p) * x(i-n) \quad (1)$$

The operation of the Farrow filter can be defined as:

$$y(i+p) = \sum_{n=0}^{N-1} \left( \sum_{l=0}^{L} b(n,l) p^l \right) x(i-n) \quad (2a)$$

where b(n,l) are the coefficients of the L degree polynomial for computing each of the coefficients c(n,p) of the N taps. As can be seen, the Farrow filter requires the storage of the b(n,l) coefficients (N*(L+1) storage locations), rather than the storage of the c(n,p) coefficients (N*P storage locations). Typically, the order of the polynomial, L, is less than five (5), whereas a common polyphase filter has thirty two (32) or more discrete phases. Therefore, a Farrow filter with L-order polynomials saves (P−(L+1))*N storage locations compared to a polyphase filter with P stages. Although a Farrow filter requires fewer storage locations, it requires substantially more operations per output sample, requiring at least N*(L+1)+L−1 multiplications for each output sample (L−1 multiplications to form the powers of p, plus L coefficient multiplications per tap, plus N multiplications in the filter 620), compared to a mere N multiplications per output sample in a polyphase filter.

To reduce complexity of a Farrow filter, the following transformation of terms is conventionally used:

$$y(i+p) = \sum_{l=0}^{L} \left( \sum_{n=0}^{N-1} b(n,l) x(i-n) \right) p^l \quad (2b)$$

Figure 6B:
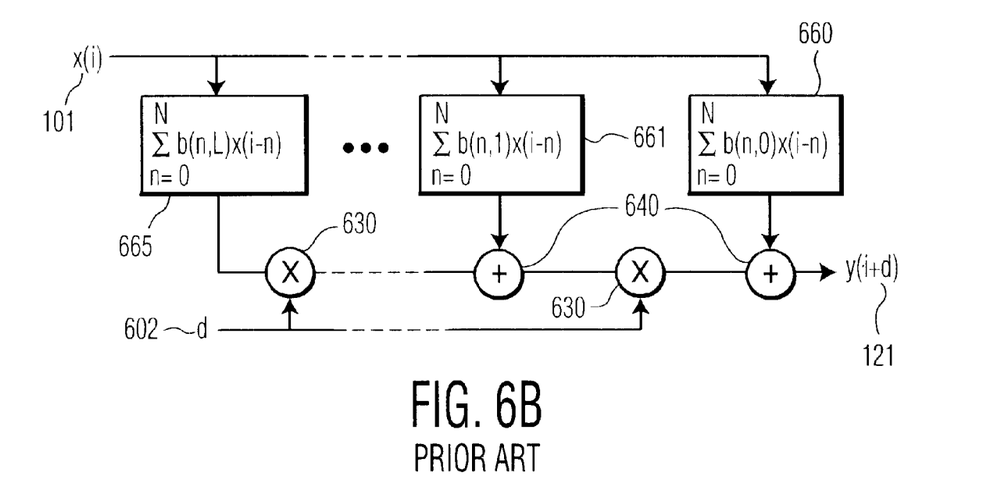

The embodiment of equation 2b is illustrated in FIG. 6B, wherein each of the blocks 660, 661, . . . 665 are configured to generate the inner summation of equation 2b. Each of the blocks 660–665 can be embodied using the structure of FIG. 3, wherein the c(n,d) terms are replaced by the corresponding b(n,1) terms (l=0 in block 660, l=1 in block 661, etc.). Note that the inner summation need only be computed once per input sample, each of the subsequent outputs at different phases being computed by the multipliers 630 and adders 640 as each phase p is input. This embodiment requires N*(L+1) multiplications for each input, and L multiplications for each output, a substantial reduction compared to the N*(L+1)+L−1 multiplications for each output of the direct embodiment of the Farrow filter. Note, however, that this optimization is limited to interpolation, wherein multiple outputs are generated for each input.

Farrow filters are not currently used in conventional video systems, due primarily to their computational complexity compared to a polyphase filter. As is known in the art, hardware multipliers are costly in terms of circuit area, and high-speed multipliers are costly in terms of power. Software filters can take advantage of general purpose high-speed multiplier co-processors, but the transfer of information for each multiplication is often too costly in time. This problem is particular acute for decimation, where the interpolation-optimized embodiment of FIG. 6B is not available.

BRIEF SUMMARY OF THE INVENTION

It is an object of this invention to improve the scaling capabilities of an image display system. It is a further object of this invention to provide a selectable scaling resolution capability. It is a further object of this invention to provide a filter that can be configured to provide both decimation and interpolation capabilities.

These objects and others are provided by a variety of aspects of this invention.

In a first embodiment, a filter structure is provided that facilitates the use of the filter as either a continuous delay Farrow filter or a selectable delay polyphase filter. The less complex polyphase filter is used when the desired scale substantially corresponds to a defined phase of the polyphase filter, or when time or power is not available to achieve the desired scale exactly; otherwise, the continuous delay Farrow filter is used. By providing an ability to switch to a continuous delay, the number of stages of the polyphase filter can be reduced.

In another embodiment, an inversion of a Farrow filter is presented that provides for a continuous delay decimation filter with substantially reduced computational complexity compared to a direct embodiment of a Farrow filter. This inverted filter is also configurable as a polyphase filter, to provide selectable scale-resolution capabilities.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 7A:
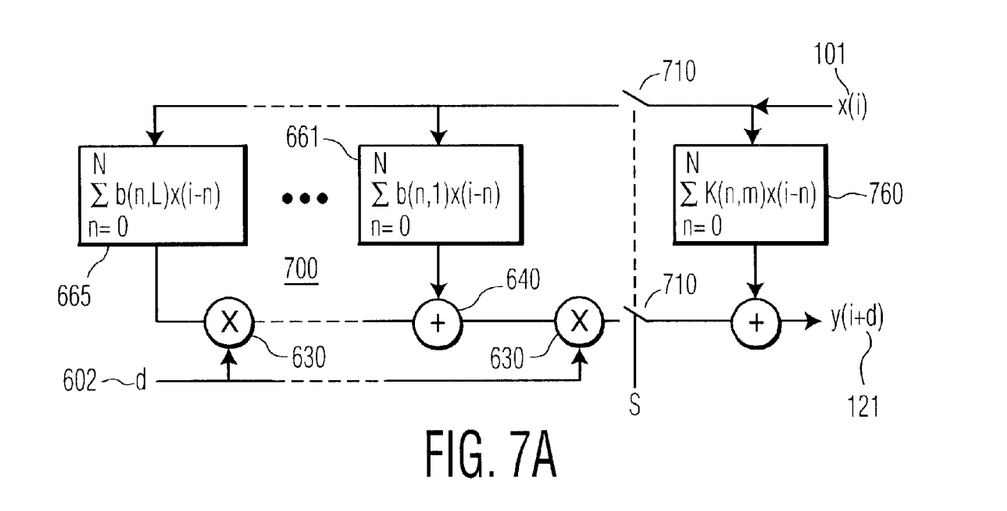
FIGS. 7A–7B illustrate an example block diagram of a combination polyphase and Farrow filter for up-scaling in accordance with this invention.

FIG. 7A illustrates an example block diagram of a combination polyphase and Farrow filter 700 for up-scaling in accordance with this invention. The combination filter 700 allows the use of the filter as either a continuous delay Farrow filter or a selectable delay polyphase filter, depending upon the state S of the switch 710 and the coefficients K(n,m) that are applied within the filter segment 760. In accordance with this invention, the coefficients K(n,m) are either the polyphase coefficients c(n,p), or the Farrow-filter coefficients b(n,0), depending upon whether discrete-delay polyphase filtering or continuous-delay Farrow-filtering is to be performed.

If the state of the switch 710 is open, the coefficients K(n,m) that are applied within the filter segment 760 are the conventional selectable delay polyphase filter coefficients c(n,m), where m corresponds to each of the phases corresponding to each output sample 121. In this way, the combination filter 700 performs as a conventional selectable delay up-scaling polyphase filter, as discussed above with regard to FIGS. 1 and 3.

If the state of the switch 710 is closed, the coefficients K(n,m) that are applied within the filter segment 760 are the conventional continuous delay Farrow filter coefficients b(n,0), corresponding to the constant terms of the polynomial approximations of each of the n taps. The input x(i) 101 is applied to each of the other filter elements 661–665, via the closed switch 710, and the outputs of each other filter element 661–665 are combined via the multipliers 630 and adders 640. In this way, the combination filter 700 performs as a conventional continuous delay up-scaling Farrow filter, as discussed above with regard to FIGS. 6A and 6B.

As illustrated, the combination polyphase and Farrow filter 700 of this invention selectively operates as either a polyphase filter or a Farrow filter for up-sampling, or interpolation, of input samples x(i) 101. This selectivity allows the use of the polyphase filter mode when the desired degree of up-scaling corresponds substantially to one of the discrete interpolation factors provided by the stored polyphase filter coefficients. That is for example, if P sets of polyphase filter coefficients are provided, interpolation factors of Q:P can be achieved directly, where Q and P are integers, by using the coefficients of every "$Q^{th}$" phase for each output sample. Conversely, when the desired up-sampling ratio does not correspond to an interpolation factor of Q:P, where Q and P are integers, the combination filter 700 can be switched into the Farrow-filter mode. In the Farrow-filter mode, the required interpolation factor is achieved by providing the phase-shift, or delay, d 602, associated with each output sample y 121. In this manner, the resolution of the achievable up-sampling ratio is only dependent upon the resolution of the delay d 602, as discussed above with respect to FIG. 5.

The selection between the use of a polyphase-filter or a Farrow-filter can provide a number of advantages. The power consumed by a device, and particularly a CMOS device, is highly dependent upon the number of operations preformed by the device, and thus the power consumed by the selection of the polyphase-filter in lieu of the Farrow-filter is substantially lower. In addition to the generally preferable use of less power whenever possible, specific application advantages can be realized. A portable computer, for example, can be configured to use only interpolation factors that are supported by the polyphase-filter when the computer is being powered by battery, and to use the Farrow-filter selection as required only when power is being supplied from an external source. Similarly, a display device may be configured to only contain the filter segment 760 of FIG. 7A as a "default" configuration, and the other segments 661–665 and associated multipliers 630 and adders 640 may be packaged as a video-enhancement module that can be purchased at an additional cost. The default configuration will provide, for example, discrete zooming capabilities, whereas the enhanced version will provide substantially continuous zooming capabilities. These advantages, and others, will be evident to one of ordinary skill in the art in view of this disclosure.

Figure 7B:
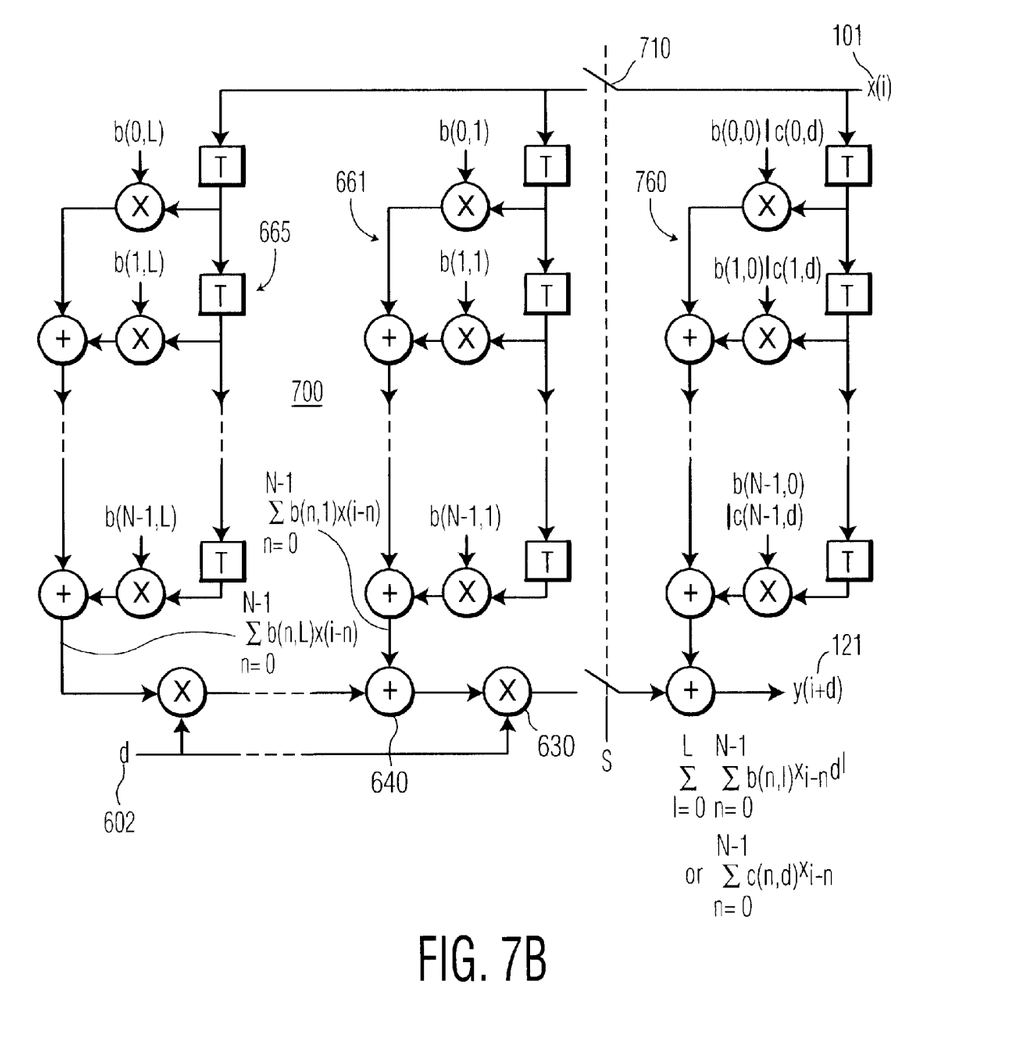

FIG. 7B illustrates an example embodiment of the combination filter 700, using the structure of the referenced U.S. Pat. No. 5,892,695 for each filter segment 661–665 and 760 of FIG. 7A. For ease of understanding, an example M:1 up-scaling is presented to describe the operation of the filter 700 in each filter mode. In the Farrow-filter mode, as each input signal x(i) is clocked into each filter segment, the M output samples y(i+d) 121 corresponding to each input signal are produced by providing each delay d 602 associated with each output sample y(i+d) 121 to the multipliers 630, and propagating the sums via the adders 640 to the output 121. The M delays d 602 correspond to phases spaced at 2π/M intervals for each input sample x(i) 101. In the polyphase mode, as each input sample signal x(i) is clocked into each filter segment, the M output samples y(i+d) 121 are produced by providing the polyphase coefficients c(n,d) corresponding to each phase delay d (at 2π/M intervals) associated with each output sample y(i+d) 121. This assumes that the polyphase filter coefficients c(n,d) are available for each phase delay d. After providing the M output samples 121, the next input sample x(i) 101 is clocked into filter segment 760, and, if in Farrow-filter mode, into filter segments 661–665, and the above processes are repeated.

If the interpolation factor is a non-integer F, the process is performed as described above, with each delay being evenly spaced by 2π/F, except that some spans between input samples will contain one more or one less samples than the other spans. For example, if the upscale factor is 3.6, the phase interval between output samples will be 100 degrees (360°/3.6). Assuming that the initial phase is 10 degrees, the first interval between input samples will contain 4 samples (at 10°, 110°, 210°, and 310° degrees), the next interval will contain 4 samples ((410°, 510°, 610°710°), or, (50°, 150°, 250°, 350°) relative to the next input sample), but the next interval will contain only 3 samples ((810°, 910°, 1010°), or, (90°, 190°, 290°)), because the sample at 1110° is within the span of the next input sample. Within every five intervals between input samples, three intervals will contain 4 output samples, and two intervals will contain 3 output samples, for a total of 18 output samples per 5 input samples, corresponding to an interpolation ratio of 3.6:1. In this example, if the polyphase coefficients c(n,p) correspond to 36 phases (every 10 degrees), the up-scaling can be performed by placing the combination filter 700 in the polyphase-mode, via switch 710, and each of the output samples can be produced by the filter segment 760 only. If, on the other hand, the polyphase coefficients c(n,p) correspond to 60 phases (every 6 degrees), the 3.6:1 scaling cannot be accurately accomplished using these polyphase filter coefficients. In this example, the combination filter 700 is set to the Farrow-filter mode, via the switch 710, and the appropriate delays are provided as input d 602 to the combination filter 700, corresponding to the 10°, 110°, 210°, 310°, 50°, 150°, 250°, 350°, 90°, 190°, 290°, etc. sequence of phase angles presented above. Preferably, the sequencing of the filter 700 is effected by repeatedly providing the delay interval to an accumulator that is structured to 'roll over' and generate a carry whenever the accumulated phase exceeds 2π; the carry thus generated is used to trigger the input of the next input sample x(i) 101. For each output sample y(i+d), the content of the accumulator (the remainder of accumulated phase divided by 2π) is provided as the delay 602. This same accumulating phase approach is used in a preferred embodiment of a decimator, disclosed following.

Figure 8:
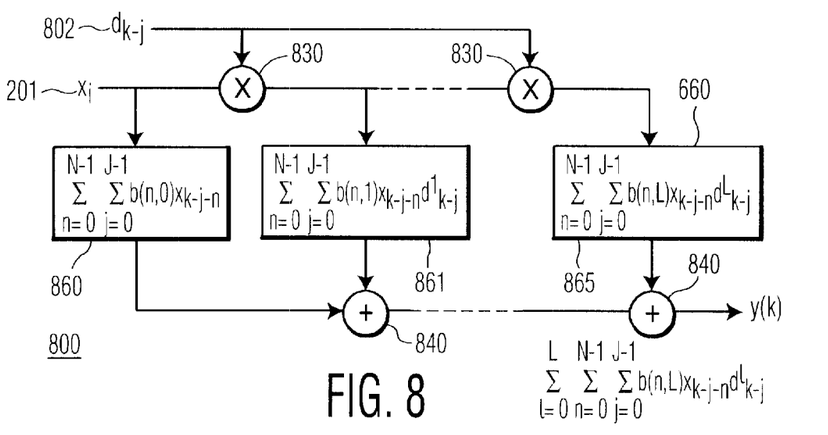
FIG. 8 illustrates an example block diagram of a Farrow filter that is optimized for down-scaling in accordance with this invention.

FIG. 8 illustrates an example block diagram of an inverted Farrow filter 800 that is optimized for decimation, or down-scaling, in accordance with this invention. Each filter segment 860–865 computes the following sum:

$$\sum_{n=0}^{N-1}\sum_{j=0}^{J-1} b(n,l) x_{k-j-n} d_{k-j}^l \quad (3)$$

where the index l corresponds to the filter segment for the $l^{th}$ polynomial estimation term, b(n,l) are the coefficients of the estimation polynomial as discussed with respect to FIG. 3, and x and d are the input samples and corresponding delays relative to an output y(k), respectively. N is the number of taps in the filter and J is the number of inputs per output sample. The output of each filter segment 860–865 is summed to produce the output y(k) 231, which corresponds to the generalized form of the decimation filter of FIG. 2, with the coefficients c(n,p) being replaced by the Farrow-filter based estimation polynomial of FIG. 3. As illustrated, in accordance with this aspect of the invention, each delay term $d_{k-j}$ is applied to the multipliers 830, and these multipliers are connected in series with each other. In this manner, the input to each filter segment 861–865 is the product of the input sample x and the delay raised to power l. That is, the $x_{k-j-n} * d_{k-j}^l$ term is provided directly as an input to each of the filter segments 860–865, thereby minimizing the computations within the dual summations of equation (3). In a preferred embodiment of this filter 800, each of the filter segments 860–865 is embodied using the structure of FIG. 4 (referenced U.S. Pat. No. 5,892,695), as illustrated in FIG. 9.

Figure 9:
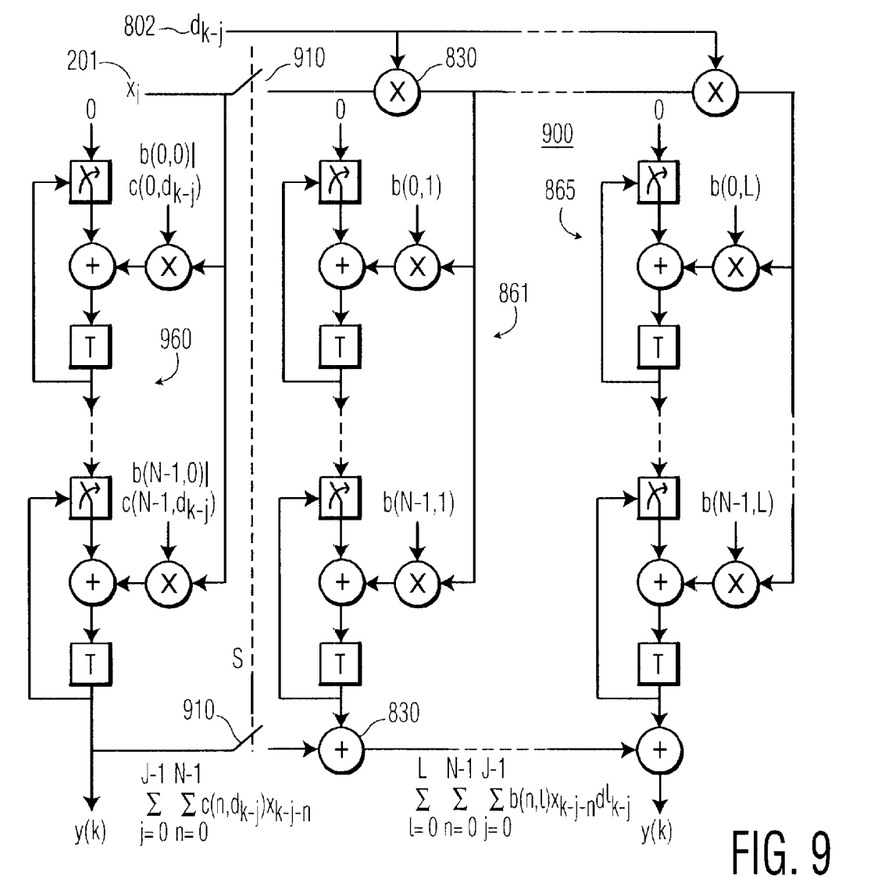
FIG. 9 illustrates an example block diagram of a combination polyphase and Farrow filter for down-scaling in accordance with this invention.

FIG. 9 illustrates an example block diagram of a combination polyphase and Farrow filter 900 for down-scaling, or decimation, in accordance with this invention. In accordance with this aspect of the invention, the filter 900 includes a switch 910 that is used to select a decimating polyphase filter, or a decimating Farrow filter. To allow for this selection, filter segment 960 is configured to contain either the polyphase coefficients c(n,p), or the Farrow-filter estimation coefficients b(n,l), similar to the filter segment 760 discussed above with regard to FIGS. 7A–7B. If the desired down-scaling factor is supported by the stored polyphase filter coefficients c(n,p), then the filter 900 is placed in the polyphase filter mode, via the switch 910, to reduce the complexity of the required computations, similar to the combination polyphase and Farrow filter 700, discussed above. In this polyphase mode, only the filter segment 960 is used, and the output y(k) is taken directly from that segment 960. If the desired down-scaling factor is not supported by the stored polyphase filter coefficients, all segments 960, 861–865 are used to generate the l polynomial terms based on the estimation parameters b(n,l), as discussed above, and the output y(k) is taken from the sum of all segments. Not illustrated, a multiplex switch, controlled by the state S of the switch 910 can be used to provide the appropriate output y(k) to a common output node, thereby making the mode used by the filter 900 "transparent"0 to subsequent stages.

Figure 10:
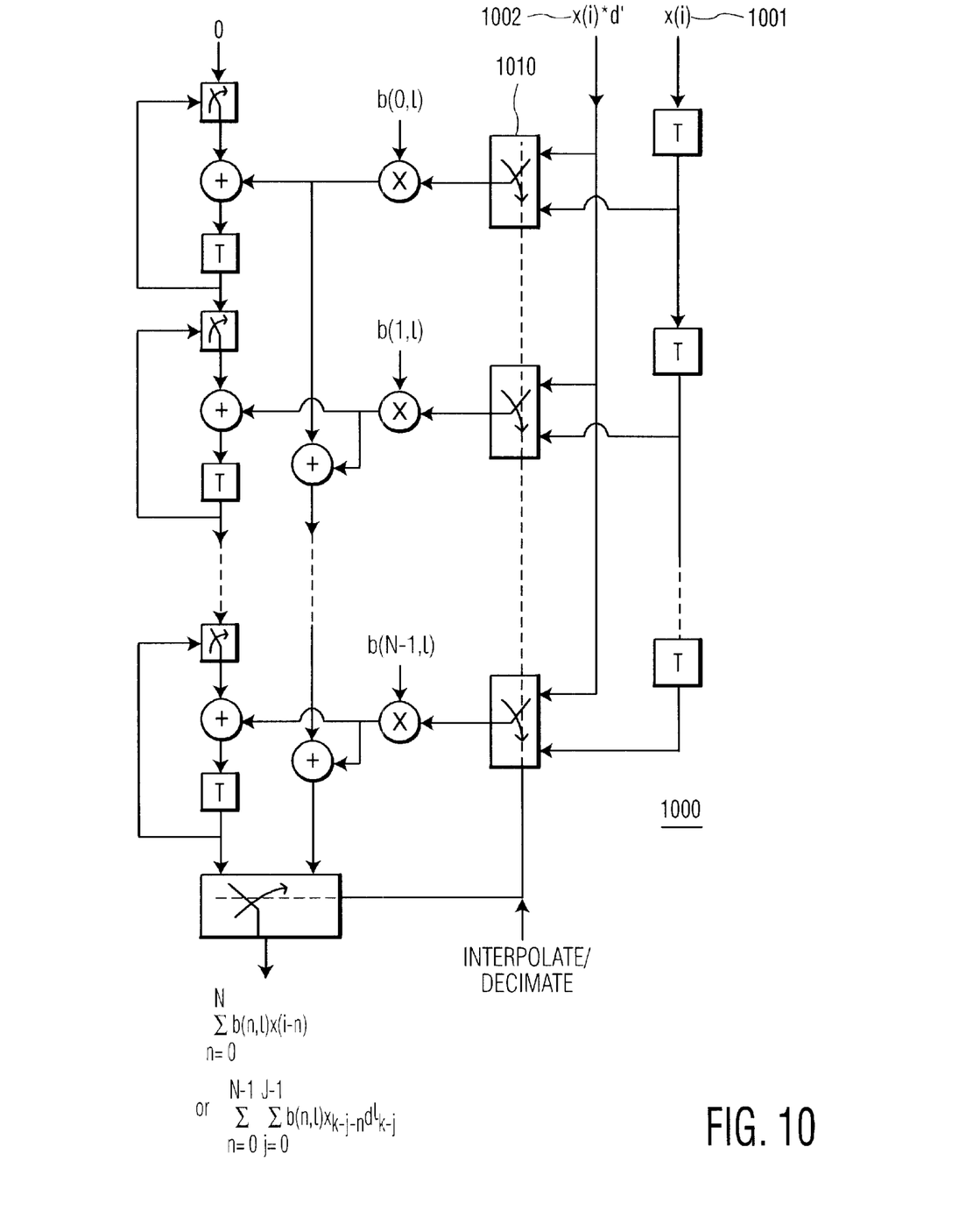
FIG. 10 illustrates an example block diagram of a combination interpolation and decimation filter stage for use in an up-scaling and down-scaling Farrow filter in accordance with this invention.

The foregoing merely illustrates the principles of the invention. It will thus be appreciated that those skilled in the art will be able to devise various arrangements which, although not explicitly described or shown herein, embody the principles of the invention and are thus within its spirit and scope. For example, referenced U.S. Pat. No. 5,892,695 illustrates an interpolation and decimation device that combines the functions of FIGS. 3 and 4, above, thereby requiring only one coefficient multiplier for each of the N taps of the filter. In like manner, the filter stages of FIGS. 7B and 9 can be combined (760 with 960, 661 with 861, . . . 665 with 865), such that only one coefficient multiplier is required for each of the N taps of each of the combined filter stages. FIG. 10 illustrates a filter stage 1000 that can be configured to correspond to either an interpolation filter stage or a decimation filter stage, via the switches 1010.

Figure 11:
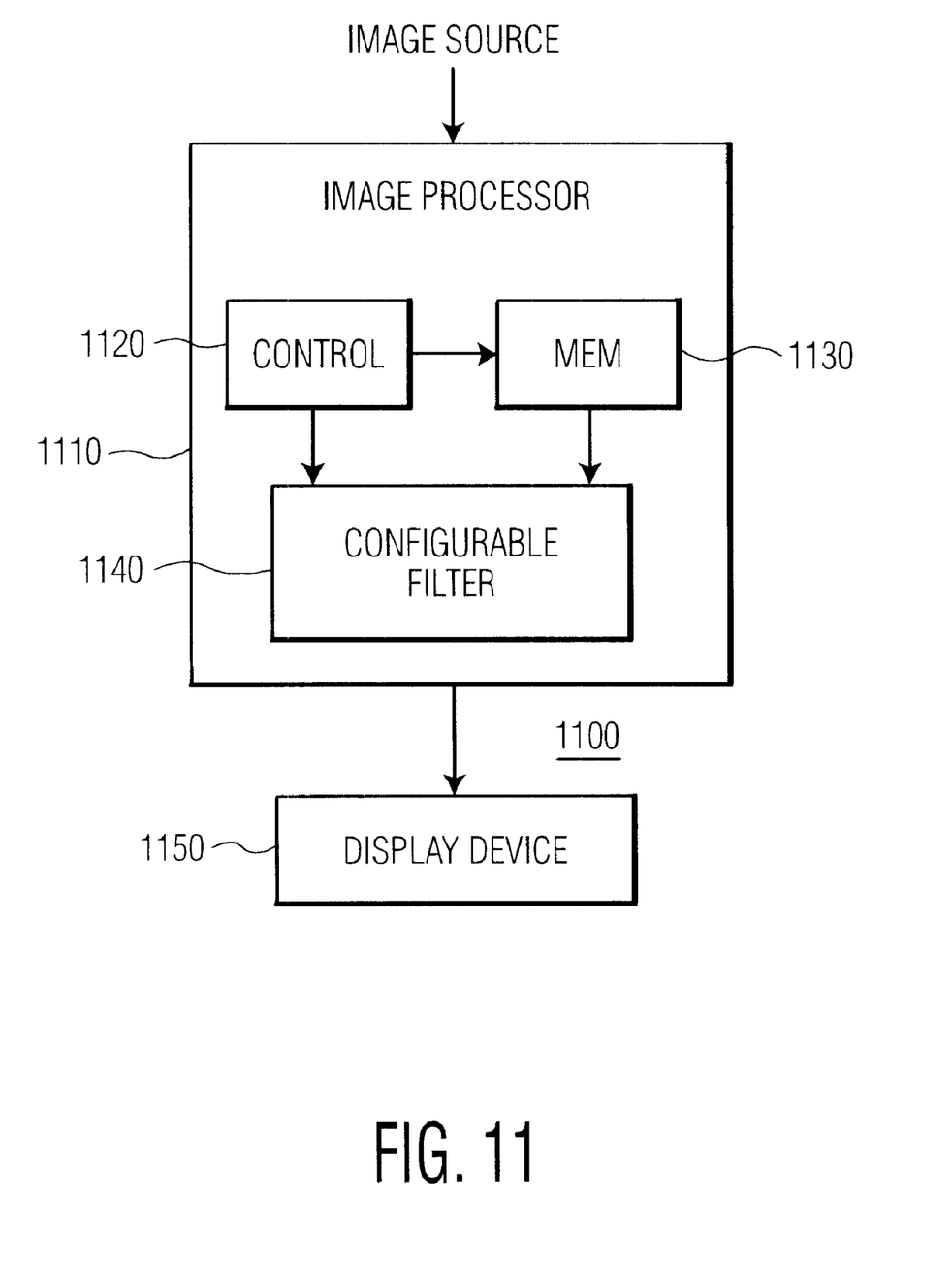
FIG. 11 illustrates an example block diagram of a display system in accordance with this invention.

FIG. 11 illustrates an example display system 1100 having an image processor 1110 that includes a configurable filter 1140. The filter 1140 corresponds to one or more filters 700, 800, 900, or combination filters comprising filter stages 1000 to perform both interpolation and decimation. Typically, a display system 1100 includes filters for effecting both horizontal and vertical scaling. The controller 1120 determines the appropriate scaling in each dimension, sets the appropriate mode of the configurable filter 1140

(interpolate or decimate, discrete phase or continuous phase, as required), and determines the appropriate coefficients that are provided by the memory 1130, depending upon the scaling and the mode.

The configurable filters and display system described herein may be embodied as hardware, software, or a combination of both. For example, the controller 1120 is typically embodied as a software program that controls the flow of data through the image processor 1110. The coefficient memory 1130 may be a memory device that is used exclusively by the filter 1140, or the coefficients may be embodied in the controller software and thereby located in a region of system memory. In like manner, all or part of the filters 700, 800, 900, 1000 may be embodied in software, the example block diagrams corresponding to data flow diagrams of software routines. These and other system configuration and optimization features will be evident to one of ordinary skill in the art in view of this disclosure, and are included within the scope of the following claims.

We claim:

1. An image display system comprising:
   at least one configurable filter, and
   at least one controllable switch that is arranged to:
      configure said at least one configurable filter as a polyphase filter when said at least one controllable switch is controlled to a first state, and
      configure said at least one configurable filter as a Farrow filter when said at least one controllable switch is controlled to a second state.

2. The image display system of claim 1, wherein
   the image display system is configured to provide a continuous interpolation for up-scaling an image by configuring said at least one configurable filter as a Farrow filter.

3. The image display system of claim 2, wherein
   the image display system is further configured to provide a continuous decimation for downscaling the image by configuring said at least one configurable filter as an inverted Farrow filter.

4. The image display system of claim 1, wherein
   the image display system is configured to provide a continuous decimation for downscaling an image by configuring said at least one configurable filter as an inverted Farrow filter.

5. The image display system of claim 1, further including a display device that is configured to render a display corresponding to an output of said at least one configurable filter corresponding to a scaling of an image that is input to said at least one configurable filter.

6. The image display system of claim 1, wherein
   said at least one configurable filter includes:
      a horizontal sample rate converter that is configured to scale an image in a horizontal direction, and
      a vertical sample rate converter that is configured to scale an image in a vertical direction.

7. The image display system of claim 1, wherein
   said at least one configurable filter comprises a plurality of filter stages,
   the plurality of filter stages includes:
      a first filter stage that is configured to receive:
         first coefficients corresponding to coefficients of a polyphase filter, when said at least one controlled switch is controlled to the first state, and
         second coefficients corresponding to estimating coefficients for a Farrow filter, when said at least one controlled switch is controlled to the second state; and
      a remainder of filter stages that are each configured to receive:
         other coefficients corresponding to other estimating coefficients for the Farrow filter, when said at least one controlled switch is controlled to the second state.

8. The image display system of claim 1, further including:
   a memory that is configured to contain:
      first coefficients corresponding to coefficients of the polyphase filter, and
      second coefficients corresponding to estimation parameters of the Farrow filter; and a controller that is configured to facilitate the transfer of:
      the first coefficients from the memory to said at least one configurable filter when said at least one controlled switch is controlled to the first state, and
      the second coefficients from the memory to said at least one configurable filter when said at least one controlled switch is controlled to the second state.

9. A filter for producing an output sample from a sequence of input samples and a sequence of delays corresponding to a temporal relationship between the output sample and the input samples, the filter comprising:
   a plurality of filter stages,
   a plurality of multipliers, and
   a plurality of adders, wherein,
   the plurality of multipliers are arranged in series, wherein
      a first multiplier in the series of multipliers receives each input of the sequence of input samples, and
      each multiplier of the plurality of multipliers receives each delay of the sequence of delays;
   the plurality of filter stages are arranged in parallel, each stage having an input and an output, wherein
      a first stage of the plurality of filter stages receives as input each input of the sequence of input samples, and
      each subsequent stage of the plurality of filter stages receives as input a corresponding output of each multiplier of the plurality of multipliers; and
   the plurality of adders are arranged in series, wherein
      a first adder in the series of adders receives the output of the first stage of the plurality of filter stages and the output of a second stage of the plurality of filter stages, and
      each subsequent adder in the series of adders receives the corresponding output of each subsequent stage of the plurality of filter stages wherein
   each stage of the plurality of filter stages comprises a plurality of accumulators, wherein:
      each accumulator of the plurality of accumulators being configured to:
         multiply the input to the stage by a corresponding coefficient to form a product term, and
         accumulate an accumulated sum of the product term corresponding to each input sample of the sequence of input samples; and
      the output of each stage corresponds to a sum of the accumulated sum of each accumulator wherein
   the coefficient of each accumulator corresponds to an estimation coefficient of a Farrow filter.

10. The filter of claim 9, further comprising
    a switch that is configured to selectively isolate the first stage of the plurality of filter stages from the subsequent stages of the plurality of filter stages, and wherein the plurality of accumulators of the first stage are configured to receive as coefficient values:

polyphase coefficients when the switch is in a first state that isolates the first stage from the subsequent stages, and Farrow-filter coefficients when the switch is in a second state that couples the first stage to the subsequent stages; and the plurality of accumulators of the subsequent stages are configured to receive Farrow-filter coefficients as coefficient values.

11. A method of filtering a first sequence of input samples to provide a second sequence of output samples, said method comprising the steps of:

determining a desired ratio of input samples to output samples, determining an available ratio of input samples to output samples, based on an available set of polyphase coefficients, and selectively filtering the first sequence of input samples to produce the second sequence of output samples using a select one of:
a polyphase filter, and
a Farrow-filter, in dependence upon the desired ratio and the available ratio.

12. The method of claim 11, wherein the step of:

selectively filtering the first sequence of input samples is further dependent upon a control that is based on at least one of: a power utilization, a speed requirement, and a resource availability.

13. The method of claim 11, further comprising the steps of:

providing at least one configurable filter;

providing at least one controllable switch for said at least one configurable filter;

configuring said at least one configurable filter as a polyphase filter when said at least one controllable switch is controlled to a first state; and configuring said at least one configurable filter as a Farrow filter when said at least one controllable switch is controlled to a second state.

14. The method of claim 13, further comprising the step of:

configuring said at least one configurable filter as a Farrow filter to provide a continuous interpolation for up-scaling an image.

15. The method of claim 14, further comprising the step of:

configuring said at least one configurable filter as an inverted Farrow filter to provide a continuous decimation for downscaling the image.

16. The method of claim 13, further comprising the step of:

configuring said at least one configurable filter as an inverted Farrow filter to provide a continuous decimation for downscaling an image.

17. The method of claim 13, further comprising the step of:

configuring a display device to render a display corresponding to an output of said at least one configurable filter corresponding to a scaling of an image that is input to said at least one configurable filter.

18. The method of claim 11, further comprising the steps of:

providing said at least one configurable filter with a horizontal sample rate converter that is configured to scale an image in a horizontal direction; and providing said at least one configurable filter with a vertical sample rate converter that is configured to scale an image in a vertical direction.

19. The method of claim 11, further comprising the steps of:

providing said at least one configurable filter with a Farrow filter that is capable of upscaling an image and that is capable of downscaling an image.

20. The method of claim 11, further comprising the steps of:

providing said at least one configurable filter with a switch circuit that is capable of switching between a polyphase filter and a Farrow filter.

* * * * *